Inventor
William W. Alexander.
By Semmes, Keegin, Beale & Semmes.
Attorney

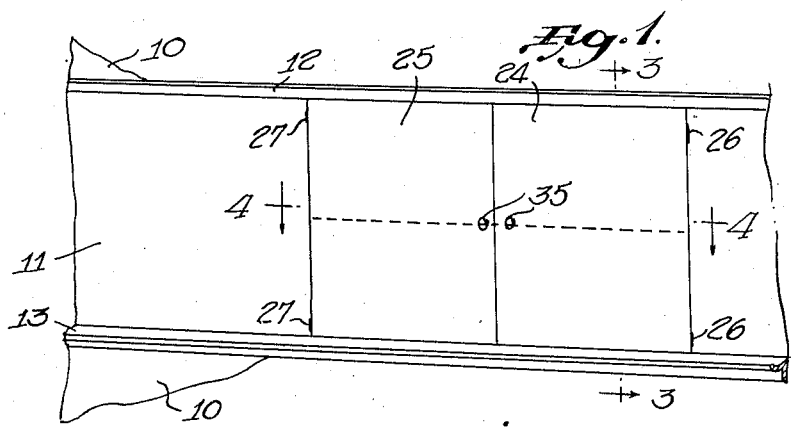
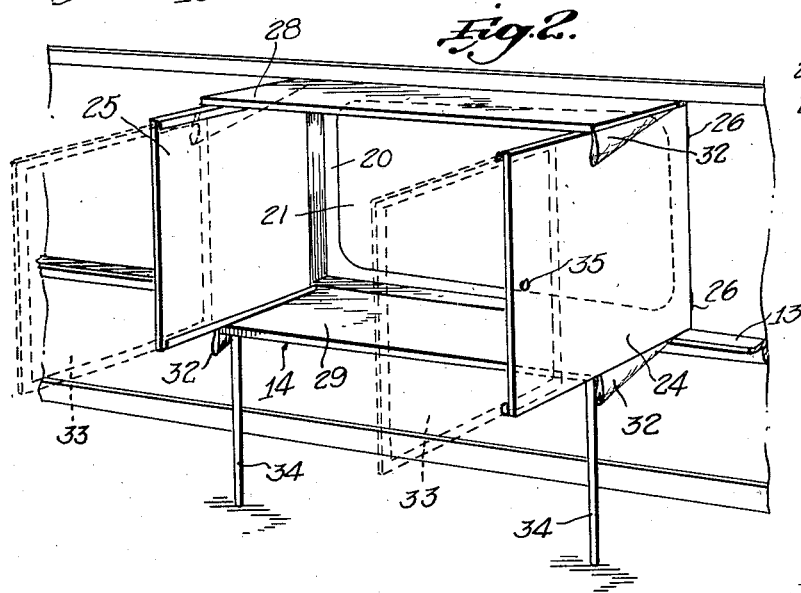
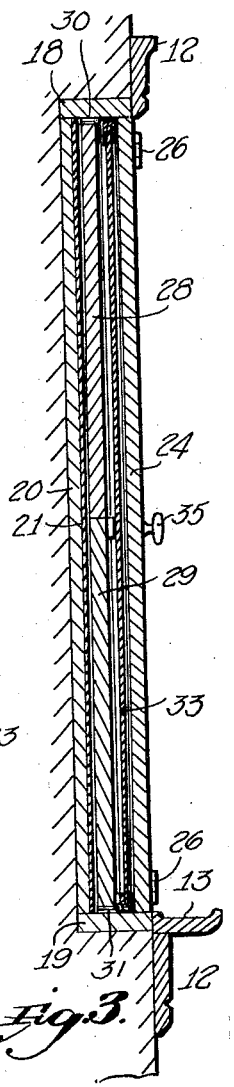
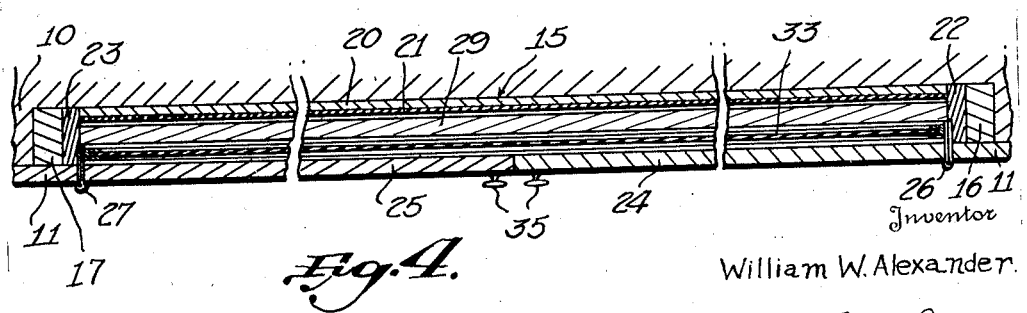
Feb. 10, 1948. W. W. ALEXANDER 2,435,620
MOVING PICTURE PROJECTION SCREEN
Filed Oct. 12, 1943 2 Sheets-Sheet 1
Inventor
William W. Alexander
By Semmes, Keegin, Beale & Semmes
Attorney Feb. 10, 1948. W. W. ALEXANDER 2,435,620
MOVING PICTURE PROJECTION SCREEN
Filed Oct. 12, 1943 2 Sheets-Sheet 2

Patented Feb. 10, 1948

2,435,620

UNITED STATES PATENT OFFICE 2,435,620

MOVING-PICTURE PROJECTION SCREEN

William W. Alexander, Atlanta, Ga.

Application October 12, 1943, Serial No. 505,977

12 Claims. (Cl. 88—28.90)

This invention relates to improvements in projection screens, and more particularly to such screens as are used for the showing of animated or still pictures. More specifically, this invention contemplates the disposition of a projection screen behind a removable wall panel and is adapted for use in schools, public auditoriums, private homes and the like.

In many schools it is now common practice to supplement the normal curriculum with the frequent use of motion pictures. Where the school has access to an auditorium containing the usual large motion picture screen, such as is usually associated with a stage, this procedure presents no difficult problem since the screen may be lowered when desired. However, in smaller schools or where it is found desirable to exhibit certain types of pictures in the individual classrooms, for instance, the problem of properly securing and effectively shading the screen is not so easily solved. Heretofore, the normal procedure has been to suspend a flexible screen across the blackboard or other portion of the wall or to use a portable screen supported on a tripod. Normally when not in use, these screens are rolled up. In either case, some difficulty has been experienced in keeping the respective screens flat and free from wrinkles. Also it is often difficult to darken the classroom sufficiently to render the pictures clear and distinct.

Accordingly, it is one of the objects of this invention to provide an improved projection screen suitable for the showing of pictures in daylight.

Another object of this invention is to provide a wall case or cabinet of the built-in type housing the screen and protecting it when not in use.

A further object of this invention is to construct a permanent wall cabinet containing a projection screen and having the outer panels of said cabinet constructed to blend with and form part of the adjacent wall surface when in closed position.

A more particular object of this invention is to provide a cabinet built into the blackboard of a school classroom for housing a projection screen.

A still further object of this invention is to provide a cabinet for a projection screen of the type having extensible wings which, in open position, may be adjusted to form a shadow box around the screen to shield the same from all natural or artificial light.

Yet another object of this invention is to provide a wall cabinet having a projection screen therein with an adjustment whereby the elevation of the reviewing screen may be controlled at will.

These and other objects of this invention will become apparent from the following specification when read with reference to the accompanying drawings wherein is illustrated a preferred embodiment of this invention.

In the drawings, wherein like numerals represent like parts throughout the several views:

Figure 1 is a side elevational view of a wall incorporating this invention and showing the cabinet in closed position.

Figure 2 is a similar view showing the cabinet in open position, exposing the projection screen.

Figure 3 is a cross sectional view taken on line 3—3 of Figure 1.

Figure 4 is a cross sectional view taken on line 4—4 of Figure 1.

Figure 5:
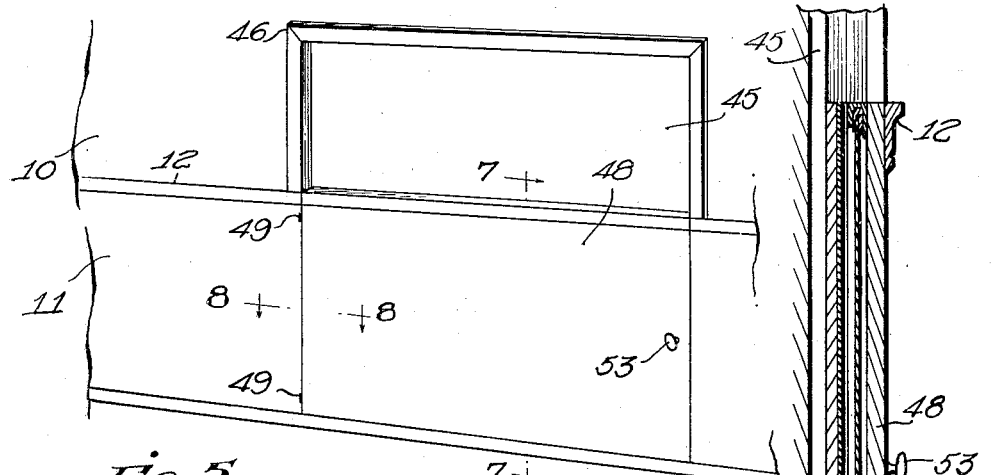
Figure 5 is a side elevational view of a modified form of this invention and showing the cabinet in closed position.

Referring to the drawings, 10 represents a portion of one of the walls of a room, more particularly that of a schoolroom. There is shown at 11 a blackboard secured to the wall 10, and disposed around this blackboard is a molding 12 with the usual chalk and brush supporting ledge 13 formed on the lower margin thereof.

A projection screen and its accompanying shadow box or cabinet, indicated generally at 14 (Figure 2), are shown seated in a depression or recess generally indicated at 15 (Figure 4) formed in the blackboard 11 and wall 10. The cabinet is mounted and supported within the recess by right and left upright members 16 and 17 and by upper and lower horizontal members 18 and 19, all of which are secured to the wall in any acceptable manner.

A panel 20 carrying a projection screen 21 is firmly and fixedly supported against the wall at the rear of the recess by being secured to anchor members 22 and 23 which in turn are held in any acceptable manner to the uprights 16 and 17. The screen 21 may consist of one or more layers of special paint applied to the panel 20, or in lieu thereof, any of the accepted devices for forming projection surfaces. Panels 24 and 25 forming the front of the shadow box are secured to the members 22 and 23 by means of a plurality of hinges 26 and 27. Interposed between the screen carrying panel 20 and the face panels 24 and 25 are intermediate panels 28 and 29. These are secured by one or more hinges 30 and 31 to the upper and lower horizontal supports 18 and 19, respectively. It will be noted in Figure 2 that the top and bottom panels 28 and 29 of the cabinet do not extend outwardly, in fully opened position, as far as the side panels 24 and 25. However, under certain circumstances, it may be desirable to construct panels 28 and 29 so that they are extensible to vary the length to which they may be projected when opened for a screening. Again, it should be noted that the panels 28 and 29 may be formed of a flexible cloth-like material in lieu of the rigid structure shown in the drawings. In such case, the side edges of the flexible panels may be tacked to the panels 24 and 25 to provide flat surfaces when the panels 24 and 25 are opened, and permit folding of the flexible members when the panels 24 and 25 are closed.

Many schools do not have sufficient blackboard space to meet normal educational requirements of the average classroom, and accordingly anything that interferes with or reduces this blackboard surface by any amount would naturally interfere with the normal instruction of the classroom. In order that a given area of blackboard surface may be maintained and yet enjoy all of the advantages of this improved and novel projection screen, the outer panels 24 and 25 are formed of material similar to or identical with the regular blackboard and form a part of this blackboard surface. Also it will be noted that when the box is in closed position (see Figure 1) the panels form a continuation of the adjacent blackboard in the same plane. With the exception of the eye of the hinges 26 and 27 and the knobs 35 for opening the panels, there are no ridges or other obstructions to interfere with the normal use of the blackboard. Obviously, recesses may be substituted for the knobs to afford a grip for opening the panels.

To increase the light-shielding effect of the open cabinet, it may be desirable to interconnect the adjacent free edges of the vertical and horizontal panels, and one such arrangement is shown at 32 and includes a flexible opaque flap. This flap could be carried by one of the edges and detachably secured to the other edge, or could be detachably secured to both edges. Any convenient means for thus detachably securing the flaps may be employed, such as the common snap fasteners, the zipper, or slots could be formed in the edge of the panels to receive tabs formed on the flaps. Also by reason of the flaps, the angularity between the panels may be readily varied to increase the visibility of the pictures being shown by shielding the light from sources more remotely displaced from the box, particularly the changing angle of sunlight during a given screening.

As a further means of increasing visibility, one acceptable arrangement is shown in Figure 2 wherein one or more panels are provided with extension wings 33 which may slide within a guideway formed by turning in the upper and lower edges of the main panels. While these extensions are shown on the vertical panels only, it is obviously within the scope of this invention to use them on the horizontal panels as well. Particularly would this be true if some form of ceiling lighting were employed.

If in the open position of the panels it is found their combined weight, with or without the extension wings, is too great to be safely supported by the hinges, one or more supporting legs 34 may be secured to one of the panels and arranged to fold within the cabinet with that particular panel. The two front or vertical panels may be opened and closed by using the knobs 35 while the intermediate or horizontal panels may be opened by means of flexible tabs or other appropriate means applied to their outer surfaces. In the event it should be necessary to maintain panels 24 and 25 in firmly closed position, for instance when they are being used in the capacity of a blackboard, any of the many types of accepted cabinet locks may be used.

In the operation of the cabinet, assuming the various parts are in the position shown in Figure 1 and that it is desirable to open the cabinet for the purpose of making the screen available for the showing of certain types of educational pictures, the front panels of the cabinet are opened by turning or pulling on the knobs 35 and swinging them to a position approximately perpendicular to the normal blackboard surface as shown in Figure 2. The top and bottom panels are likewise pulled out and swung upwardly and downwardly, respectively, between the front panels, to their proper position. The face panels 24 and 25 may then be swung back slightly to a position under the upper panel to support it in elevated position and above the lower panel to be supported thereby as shown. With the lowering of the legs 34, securing the flaps and drawing out the one or more panel extensions, the screen is ready for use.

In some instances it may be inconvenient or undesirable to incorporate this novel projection screen into the blackboard or other wall surface, but a screen of this type would be advantageous were it constructed in the form of a portable box, of appropriate dimensions, that could be temporarily suspended in front of or against the blackboard or wall. In such case, of course, the device would afford additional blackboard facilities. It is contemplated that such a box or cabinet is within the scope of this invention and would be formed substantially as described for the built-in type of cabinet.

The modification shown in Figures 5 to 8, inclusive, is constructed generally similar to that already described and additionally includes a provision for elevating the projection screen above the blackboard so that a picture projected thereon may be clearly visible to those at the rear of a room. To that end, Figure 5 shows a recess 45 formed in the wall extending above the blackboard while a molding 46 extends around three sides of this upper recess. The upper recess 45 and the lower recess 15 are shown to be continuous in Figure 7. Some class-rooms are so arranged as to receive all of their light from one side, and accordingly a projection screen used in such rooms may require light-shielding only on that side.

Figures 6, 7:
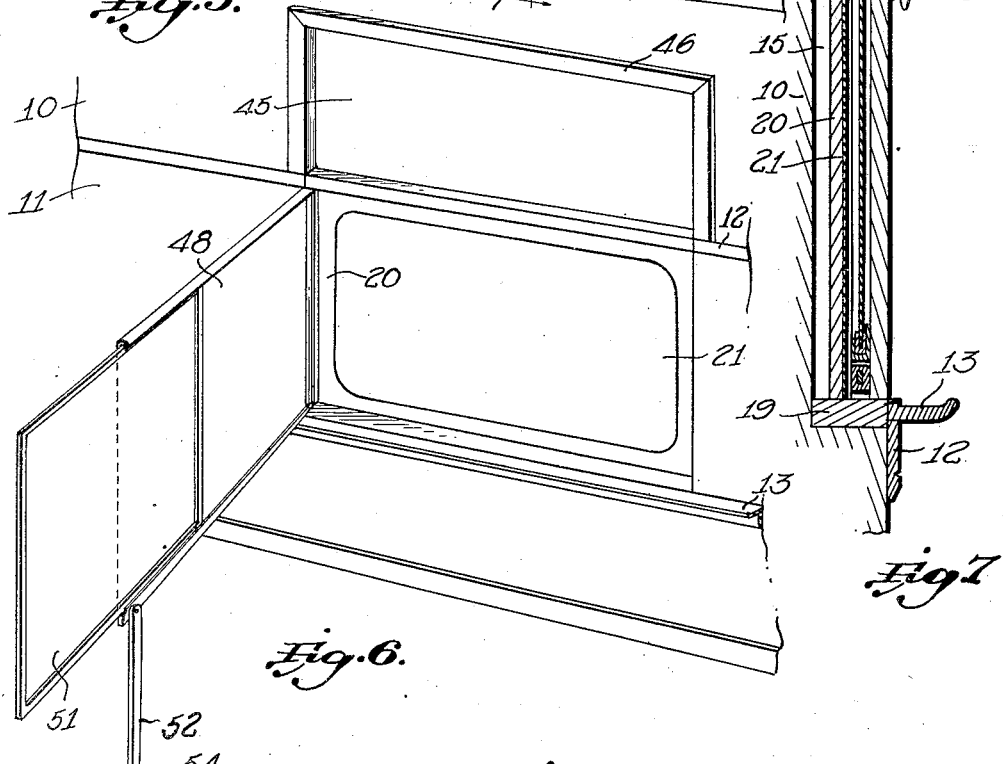
Figure 6 is a view similar to Figure 5 but showing the cabinet opened, exposing the screen.
Figure 7 is a sectional view taken along line 7—7 of Figure 5.
Figure 8:
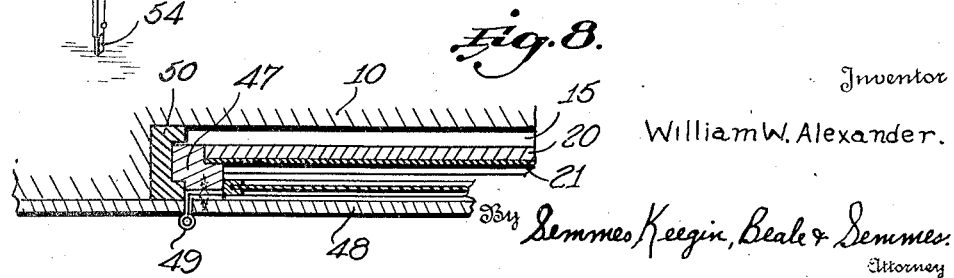
Figure 8 is a cross sectional view taken on line 8—8 of Figure 5.

It will be observed that in Figure 6 the top and bottom light-shielding panels are eliminated and that a single face panel 48 has been made sufficiently large to cover the whole recess. In Figure 8 the panel 20 carrying the screen 21 is secured to a pair of upright anchor members 47 disposed at either side of the recess, although in the figure only one of them is shown. The single face panel 48 is also secured to this anchor member by means of one or more special type of hinges 49. These uprights extend only to the upper margin of the panel 20 and normally rest on the bottom horizontal member 19 (see Figure 7). The anchors are adapted to slide in channels formed in the inside face of upright runners 50. These runners extend to the top of the recess 45, one on either side, and are secured therein by any suitable means. The front panel is provided with an extension panel 51, a supporting leg 52 and an opening knob 53. As previously mentioned, this panel may be formed of blackboard material to conform with the remainder of the wall.

In the operation of this modification, the operator opens the panel 48 to the desired angle to clear the screen, lowers the supporting leg 52 and, if necessary, withdraws the extension panel 51. The pictures may be shown with the screen and cabinet in this normal position.

To elevate the screen, it is merely necessary to grasp the upper molding 12 or the lower edge of the panel 48 adjacent the lower hinge and lift the cabinet upwardly. Since the panels are constructed of light wood or thin sheet metal, the cabinet is not heavy and the anchors 47 are adapted to slide freely within the panels formed in the uprights 50. When the cabinet has reached its upper limit of travel, the lower edge of the anchor members 47 will uncover detents, not shown, but built into the channels of the uprights 50. These detents will be forced out, by light springs, in the path of the anchor members 47 and will maintain the cabinet in the upper picture-showing position. Other examples of locking the cabinet in the elevated position could be used with equal facility and could include the use of the ordinary dowel pin inserted in an opening formed in the channels. The supporting leg 52 contains a telescoping section 54 which may be lowered and locked to properly support the panel in its elevated position.

While the projection screen according to this invention is shown and described in connection with a blackboard in a school classroom, it is contemplated that it may also be used in other situations including that of projecting pictures in the home. In this instance, the blackboard panels would be dispensed with and such panels used as would conform to and blend with the surrounding walls of the home. Or again the device may be incorporated in a mirror or other decorative device, such as, for instance, a painting. A projection screen of this type could also be used in hotel lobbies and other public meeting places. The face panels could be made to conform with the surrounding walls, as indicated above, and the exterior surfaces of these panels would provide space for advertising matter which would be prominently displayed when the cabinet was not in use and the panels closed.

It is also contemplated that the various modifications of the projection screen disclosed in this invention may be used interchangeably if so desired, and are not to be construed strictly as shown.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. A device for viewing images projected by a motion picture projector or the like, comprising a rectangular screen member having an image receiving surface, panel means hinged adjacent the edge of said screen member and adapted to be swung outwardly therefrom at an angle to the image reflecting surface to shade the same, and auxiliary panel means carried by the first named panel means for variable telescopic adjustment with respect thereto for additionally shading the image receiving surface in variable amounts to meet varying conditions of extraneous light.

2. A device for viewing images projected by a motion picture projector or the like, comprising a rectangular screen member having an image receiving surface, separate panels hinged adjacent edges of said screen member and adapted to be swung outwardly therefrom at an angle to the image reflecting surface to shade the same, and an auxiliary panel carried by at least one of said first named panels for variable telescopic adjustment with respect thereto for additionally shading the image receiving surface in variable amounts to meet varying conditions of extraneous light.

3. A device for viewing images projected by a motion picture projector or the like, comprising a rectangular screen member having an image receiving surface, panel means hinged adjacent the edge of said screen member and adapted to be swung outwardly therefrom at an angle to the image reflecting surface to shade the same, channel means carried by the panel, an auxiliary panel carried by the channel means for variable sliding adjustment therein, whereby the auxiliary panel may be telescopically extended with respect to the main panel to additionally shade the image receiving surface in variable amounts to meet varying conditions of extraneous light.

4. A device for viewing images projected by a motion picture projector or the like, comprising a rectangular screen member having an image receiving surface, separate panels hinged adjacent edges of said screen member and adapted to be swung outwardly therefrom at an angle to the image reflecting surface to shade the same, channel means carried by at least one of said panels, an auxiliary panel carried by the channel means for variable sliding adjustment therein, whereby the auxiliary panel may be telescopically extended with respect to the main panel to additionally shade the image receiving surface in variable amounts to meet varying conditions of extraneous light.

5. A device for viewing images projected by a motion picture projector or the like, comprising a rectangular screen member having an image receiving surface, separate panels hinged adjacent edges of said screen and adapted to be swung outwardly to lie at an angle thereto to shade the image receiving surface, an auxiliary panel carried by at least one of the main panels for variable telescopic adjustment thereto for additionally shading the image receiving surface in variable amounts to meet varying conditions of extraneous light, the main panels being so arranged that when swung inwardly with respect to the screen they will lie substantially parallel therewith and substantially cover the same.

6. A device for viewing images projected by a motion picture machine or the like comprising a frame having a rectangular recess, an image receiving screen adjacent the rear wall of the recess, separate panels hinged adjacent edges of the frame and adapted to be swung outwardly at an angle to the screen to shade the same, an auxiliary panel carried by at least one of the main panels for variable telescopic adjustment with respect thereto for additionally shading the screen in variable amounts to meet varying conditions of extraneous light, said main panels being so arranged that when swung inwardly with respect to the screen, a portion of said panels fits within the recess and the remainder of the panels forms a closure for the recess.

7. A device for viewing images projected by a motion picture machine or the like comprising a frame having a rectangular recess, an image receiving screen adjacent the rear wall of the recess, separate panels hinged adjacent edges of the frame and adapted to be swung outwardly at an angle to the screen to shade the same, channel means carried by at least one of the panels, an auxiliary panel carried by the channel means for variable sliding adjustment therein whereby the auxiliary panel may be telescopically extended with respect to said main panel to additionally shade the screen in variable amounts to meet varying conditions of extraneous light, and said main panels being so arranged that when swung inwardly a portion thereof fits within the recess and the remainder forms a closure for the recess.

8. In a vertical wall of a room or the like having a rectangular recess therein, a device for receiving images projected by a motion picture machine or the like comprising an image receiving screen mounted within said recess, panel means hingedly associated with the screen and adapted to cover said recess and form a substantially continuous surface with the wall, said panel means being displaceable to a position to uncover the recess and to shade the screen, and auxiliary panel means carried by the first named panel means and telescopically extensible with respect thereto for providing varying amounts of additional shading for the screen.

9. In a vertical wall of a room or the like having a rectangular recess therein, a device for receiving images projected by a motion picture machine or the like comprising an image receiving screen mounted within said recess, panel means hingedly associated with the screen and adapted to cover said recess and form a substantially continuous surface with the wall, said panel means being displaceable to a position to uncover the recess and to shade the screen, auxiliary panel means carried by the first named panel means and telescopically extensible with respect thereto for providing varying amounts of additional shading for the screen, and means for supporting the first named panel in screen-exposing position.

10. In a vertical wall of a room or the like having a rectangular recess therein, a device for receiving images projected by a motion picture machine or the like comprising an image receiving screen mounted within said recess, panel means hingedly associated with the screen and adapted to cover said recess and form a substantially continuous surface with the wall, said panel means being displaceable to a position to uncover the recess and to shade the screen, auxiliary panel means carried by the first named panel means and telescopically extensible with respect thereto for providing varying amounts of additional shading for the screen, and collapsible means for supporting the first named panel in screen-exposing position.

11. In a vertical wall of a room or the like having a rectangular recess therein, a device for viewing images projected by a motion picture machine or the like within the recess and comprising a box-like frame having side walls in sliding engagement with the side walls of the recess, the height of the frame being less than the height of the recess to permit vertical movement of the frame within said recess, an image receiving screen forming the rear wall of the frame, separate panels hinged adjacent edges of the frame and adapted to be swung outwardly with respect to the screen to shade the same, and an auxiliary panel carried by at least one of the main panels for telescopic movement with respect thereto for additionally shading the screen.

12. In a vertical wall of a room or the like having a rectangular recess therein, a device for viewing images projected by a motion picture machine or the like within the recess and comprising a box-like frame having side walls in sliding engagement with the side walls of the recess, the height of the frame being less than the height of the recess to permit vertical movement of the frame within said recess, an image receiving screen forming the rear wall of the frame, separate panels hinged adjacent edges of the frame and adapted to be swung outwardly with respect to the screen to shade the same, channel means carried by at least one of said panels, an auxiliary panel slidably carried by the channel means whereby the auxiliary panel may be telescopically extended with respect to the main panel for additionally shading the screen.

WILLIAM W. ALEXANDER.

REFERENCES CITED

The following references are of record in the file of this patent:

UNITED STATES PATENTS

| Number | Name | Date |
|---|---|---|
| 2,224,020 | Jones et al. | Dec. 3, 1940 |
| 1,485,714 | Roach | Mar. 4, 1924 |
| 1,636,236 | Kraft | July 19, 1927 |
| 1,351,765 | Koch | Sept. 7, 1920 |
| 1,908,831 | Edward | May 16, 1933 |
| 655,502 | Messinger | Aug. 7, 1900 |
| 1,817,062 | Byrnes et al. | Aug. 4, 1931 |
| 1,675,953 | Nichol | July 3, 1928 |
| 2,062,878 | Hammel | Dec. 1, 1936 |

FOREIGN PATENTS

| Number | Country | Date |
|---|---|---|
| 532,528 | France | Nov. 16, 1921 |
| 510,084 | Great Britain | July 24, 1939 |